United States Patent [19]

Eisner et al.

[11] Patent Number: 4,823,139
[45] Date of Patent: Apr. 18, 1989

[54] ELECTRONIC COUNTERMEASURE SYSTEM

[75] Inventors: William Eisner, La Mirada; Thomas W. Hoban, Fullerton; Robert M. Klees, Costa Mesa; Richard L. Smith, Anaheim, all of Calif.

[73] Assignee: Rockwell International Corporation, El Segundo, Calif.

[21] Appl. No.: 741,143

[22] Filed: Jun. 28, 1968

[51] Int. Cl.⁴ .............................................. G01S 7/38
[52] U.S. Cl. ...................................................... 342/15
[58] Field of Search .................... 343/18; 342/13, 14, 342/15

[56] References Cited

U.S. PATENT DOCUMENTS

| | | | |
|---|---|---|---|
| 2,931,031 | 3/1960 | Deloraine et al. | 343/18 E |
| 2,989,744 | 6/1961 | Pettit | 343/18 E |
| 3,007,159 | 10/1961 | Dedington | 343/18 E |
| 3,277,476 | 10/1966 | Sabin et al. | 343/18 E |
| 4,006,478 | 2/1977 | Lewis et al. | 342/15 X |
| 4,117,484 | 9/1978 | Shizume | 342/15 |

Primary Examiner—T. H. Tubbesing
Attorney, Agent, or Firm—H. Fredrick Hamann; George A. Montanye; James F. Kirk

[57] ABSTRACT

A countermeasure method and apparatus for use by two mutually cooperating aircraft against a radar-homing anti-aircraft missile, and including the steps of transferring doppler shifted radar signals received at a respective one to the other of the two mutually cooperating aircraft, and retransmitting the transferred radar signals toward the homing missile, thus simulating a target having the doppler characteristics of each of the two aircraft and further having a centroid located between the two aircraft.

4 Claims, 4 Drawing Sheets

ELECTRONIC COUNTERMEASURE SYSTEM

CROSS-REFERENCE TO RELATED APPLICATIONS

1. U.S. Pat. No. 3,595,800; filed June 21, 1966; issued July 20, 1971; to W. E. Stoney for Moving Target Angle Tracking System.

2. U.S. application Ser. No. 703,234 filed Jan. 31, 1968, by R. L. Caswell, a Notice of Allowability issued 07/29/68; and a "Rescinding Order" was granted on 09/08/87 for Electronic Countermeasure Means.

BACKGROUND OF THE INVENTION

The military application of aircraft to penetration missions, wherein a hostile territory is penetrated either for reconnaisance or weapon delivery purposes, exposes such aircraft to attack by hostile weapons such as radar-guided missiles. Such missiles may include angle-tracking radars the angle-tracking control signals of which are employed to steer the missile toward the penetrating vehicle, as described for example in copending U.S. application Ser. No. 566,970 filed July 21, 1966, and then issuing as U.S. Pat. No. 3,595,800 on July 20, 1971 by W. E. Stoney, assignor to North American Aviation, Inc., later known as North American Rockwell Corporation, and now known as Rockwell International assignee of the subject invention. Such missile system may also include doppler discrimination means for distinguishing a selected airborne target from ground clutter and even from other moving targets.

Various deception techniques have been developed in the prior art for use on individually operating aircraft, for denying target angle, or accurate direction, information to such missile systems. One such technique is described in copending U.S. application Ser. No. 703,234 filed Jan. 31, 1968, by R. L. Caswell, assignor to North American Rockwell Corporation assignee of the subject application. A Notice of Allowability issued on this application on 07/29/68 and a Rescinding Order was granted on 09/08/87. Such technique however is restricted to use at low altitudes. Other prior art techniques require considerable a priori knowledge of the missile system characteristics in order to be effective, and involve complex countermeasure equipment.

SUMMARY OF THE INVENTION

By means of the concept of the subject invention, the above-noted tactical limitations and requirement for a priori knowledge of the missile radar system, are avoided.

In a preferred embodiment of the invention, a counter measure method and apparatus are provided for use by at least two mutually cooperating aircraft against a radar-homing missile, which method includes the steps of transferring doppler shifted radar signals received at a respective one to the other of the two mutually cooperating aircraft, and retransmitting the transferred radar signals toward the homing missile. In this way, such retransmission coupled with the reflective radar-target properties of the aircraft simulate a composite target having the doppler characteristics of each of the two aircraft and a centroid located between the two aircraft. Thus, a radar-guided missile, even though employing doppler discrimination, would tend to track a point located between the two aircraft, rather than tracking either one of them. Accordingly, it is a broad object of the invention to provide improved electronic countermeasure means.

Another object of the subject invention is to provide countermeasure means not restricting the aircraft to extremely low level flight profiles.

Still another object of the invention is to provide means for at least two mutually cooperating aircraft which simulates a target having the doppler characteristics of each of the two aircraft and further having a centroid located between such two aircraft.

These and other objects of the invention will be appreciated from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
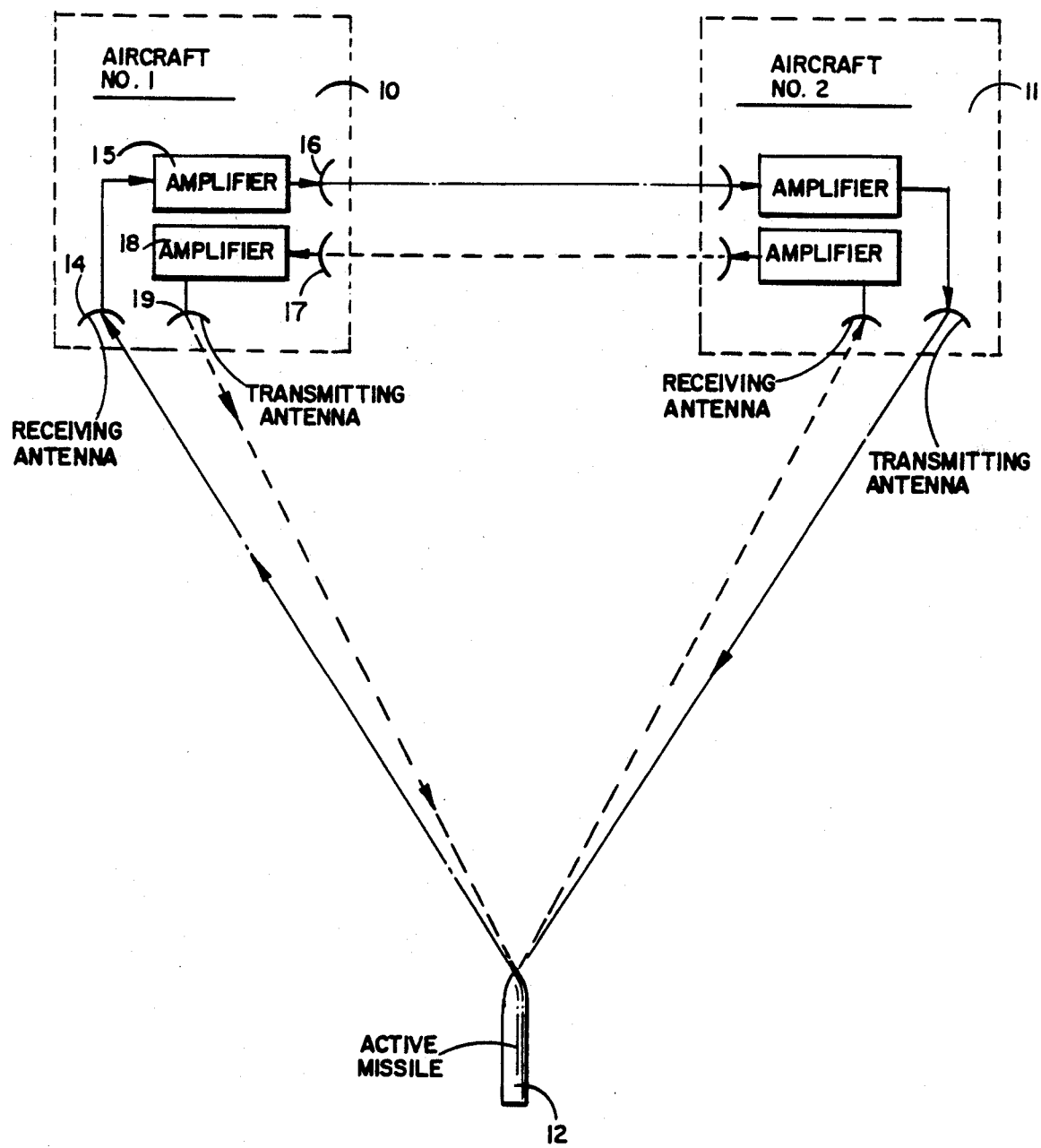
FIG. 1 is a schematic arrangement, partially in block form, of a system embodying the inventive concept.

Referring now to FIG. 1, there is illustrated in block form, a system in which the concept of the invention may be advantageously employed. There is illustrated first and second transceiver means aboard a respective one of two mutually cooperating aircraft, represented by dotted blocks 10 and 11. The first transceiver means (within dotted block 10) is arranged to receive radio energy from within a solid angle or sector generally forward of such first aircraft (such as from the active radar of an intercepting missile 12) for retransmission of such received energy in a generally lateral direction toward the second one of the two aircraft, and is further arranged to receive energy from the second aircraft for transmission generally forward of the first aircraft. The second transceiver means (within dotted block 11) is similarly arranged, receiving radio energy from radar missile 12 for transmission toward first aircraft system 10 and also receiving radio energy transmission from first aircraft system 10 for transmission toward missile 12. Each of the on-board counter measure transceivers of FIG. 1 is similarly constructed and arranged, and includes a receiving antenna 14 responsive to radar interrogation signals received from missile 12, a communication transmitter responsively coupled to antenna 14 and comprising a RF amplifier 15 and relay antenna 16. There is also provided a communication receiving antenna 17 responsive to relay transmission from the other of the several cooperating aircraft, and a relay transmitter comprising a second RF amplifier 18 and a transmitting antenna 19.

In normal operation of the arrangement of FIG. 1, radar energy transmitted by a radar system aboard missile 12 is reflected from each of the two target aircraft as doppler shifted echoes, the doppler shift of a particular echo source being a function of the velocity vector of the source of such echo relative to the missile and of the missile radar look angle, as is well understood in the art. The strength of the echo return will be a function of the missile radar look angle and the missile antenna pattern, among other things.

The doppler-shifted radar signals received for example, at aircraft system 10 by antenna 14, are relayed by antenna 16 to aircraft system 11 for retransmission back to missile 12. Thus, two signals of substantially like range time occurrence and like doppler-shift, but of different directions, are received by missile system 12, in response to the doppler shift imparted by aircraft 10. Accordingly, a composite target is simulated, having like doppler properties as aircraft 10 but having a centroid located somewhere between the two aircraft 10 and 11.

A similar result occurs in response to radar energy directed from missile 12 toward the second aircraft system 11, a second composite target being simulated, having like doppler properties as aircraft 11 and having a centroid located somehere between the two aircraft 10 and 11.

At long range, the two aircraft 10 and 11 cannot be resolved either in angle or velocity by the radar system of missile 12; hence the missile homes on a point near the radiation centroid. As the missile approaches the range at which the two targets 10 and 11 can be resolved in angle, the missile antenna pattern is instrumental in tracking one of the two targets by causing the missiles radar or illuminator to track a point progressively closer to one target as the missile antenna pattern reduces the received power from the second target. This would normally allow the missile to eventually home on one target, but for the invention.

Where the missile attempts to track the doppler property associated with aircraft 10, for example, and turns toward aircraft 10 as to illuminate such target by the boresight axis portion of the missile antenna, the intensity of the illumination of target 10 by the missile radar will tend to increase, thereby increasing the strength of the relay transmission by second aircraft 11. Such increase in the relay transmission tends to draw the missile heading away from aircraft 10 and toward second aircraft 11. As the missile heading is drawn toward the relay transmission of aircraft 11, the intensity of the illumination of aircraft 10 is reduced, due to the above-noted directivity of the missile antenna pattern. The reduced illumination of aircraft 10 will thus result in a reduction in the power level of the relay transmission from second aircraft 11. Hence, where the missile attempts to track the doppler characteristic and direction of first target aircraft 10, a composite target of such doppler properties is simulated, presenting a target centroid lying between the two cooperating aircraft 10 and 11. It is to be understood that a similar result obtains in response to the missile seeking to track the doppler characteristics and direction of the second aircraft 11. Accordingly, it is to be appreciated that the radar-guided missile is induced to miss the two aircraft by means of the cooperation between them.

Figure 2:
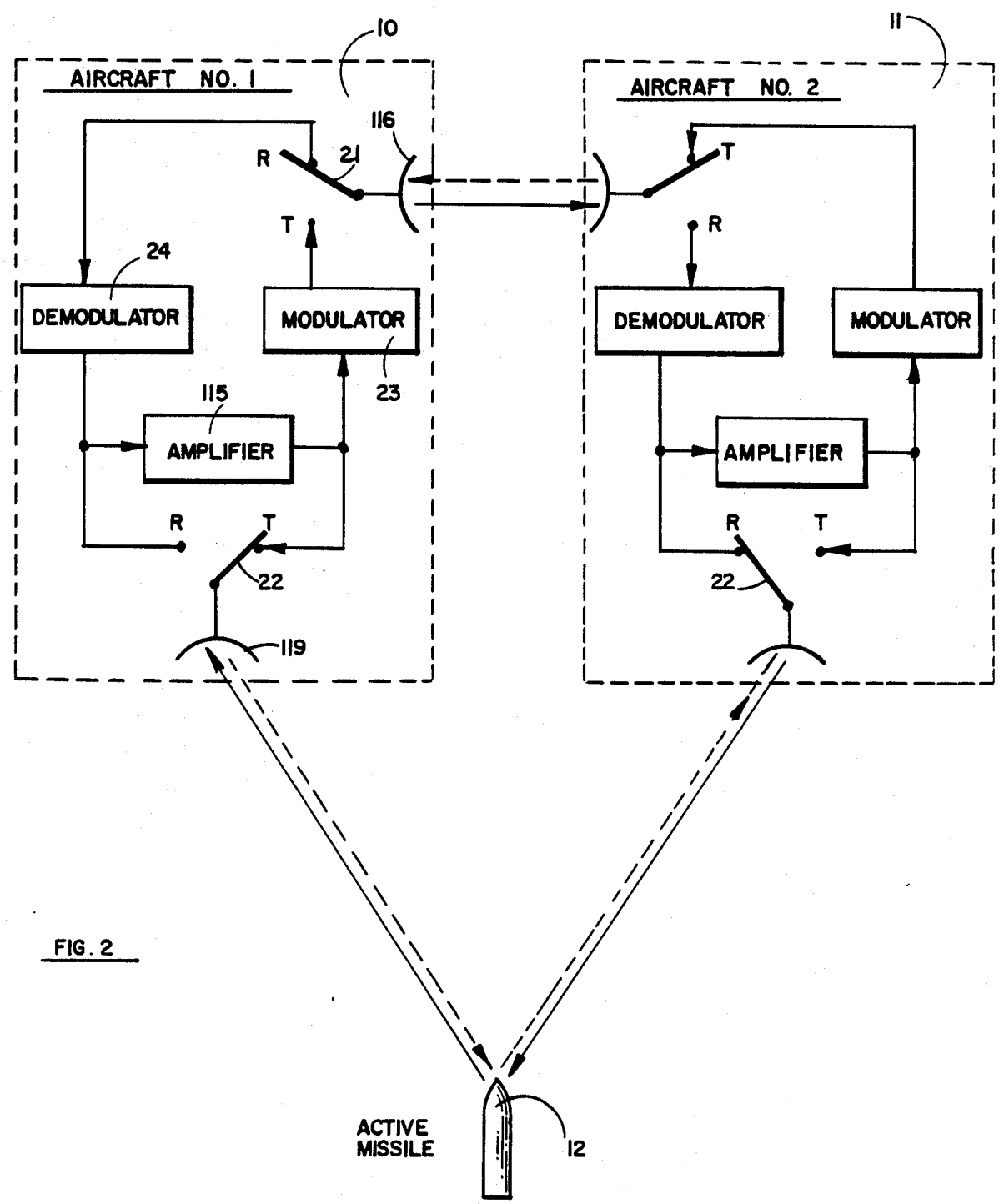
FIG. 2 is a block diagram of an alternate embodiment of the inventive concept.

A mechanization involving fewer RF amplifier stages, or repeater devices, and providing certain performance improvements is shown in the alternate embodiment of FIG. 2.

Referring to FIG. 2, there is illustrated an alternate embodiment of the inventive concept, employing a time-shared mode of relay operation. In such alternate arrangement of the transceiver system of each of aircraft 10 and 11 each system includes a common antenna 119 for receiving illumination from and transmitting to missile 12, and a common communcation antenna 116 for receiving relay signals from and transmitting relay signals to the other of the two cooperating shipboard systems. There is also provided a first and a second transmit-receive switch 21 and 22 respectively coupled to a respective one of antennas 116 and 119, switches 21 and 22 being operated synchronously in mutually exclusive states (by control means not shown). A single common RF amplifier 115 is further provided for signal transport of RF signals from a receive terminal R of each of switches 21 and 22 to transmit terminal T of the other of switches 21 and 22.

In normal operation of the arrangement of FIG. 2, both aircraft do not transmit toward missile 12 simultaneously. Instead, the transmission mode is time-shared between the two aircraft 10 and 11, as indicated by the timing diagram of FIG. 3. As illustrated by the exemplary switching states in FIG. 2, missile radar illumination received by the transmit/receive antenna of second aircraft 11 is fed through the associated transmit-receive switch 22 to amplifier 115, and from thence through another transmit-receive switch to a communication antenna for transmittal to a corresponding communication antenna 116 of aircraft 10. As illustrated in FIG. 2, the signal received at antenna 116 (of aircraft 10) is fed by switch 21 through RF amplifier 115 to the "transmit" or T terminal of switch 22, and is then retransmitted by antenna 119 (from aircraft 10) toward missile 12.

At a preselected periodicity, the states of the transmit-receive switches in FIG. 2 are synchronously changed (by switch control means not shown), whereby energy received by the aircraft system 11 in no longer transferred to vehicle system 10 for retransmission to missile 12. Instead, that energy received by antenna 119 of vehicle system 10 will now be fed by the alternate state of switch 22 through amplifier 115 to the transmit or "T" terminal of switch 21 for transfer by antenna 116 to vehicle system 11. The alternate states of the switches of vehicle system 11 cooperate to transport the transferred signal through the RF amplifier stage and effect transmission of the transferred signal back to missile 12.

The signal transfer between the two aircraft 10 and 11 may be effected by utilizing the received radar signal (from missile 12) as a modulating signal for modulation of a higher frequency communication carrier, utilized for communication or signal transfer between vehicle system 10 and 11. Thus a modulator 23 may be incorporated between the output of amplifier 115 and the T terminal of switch 21 and an associated demodulator 24 (for removal of the communication carrier) interposed between the R terminal of switch 21 and the input to amplifier 115.

The sequencing of the alternate transmission modes effects a scintillation of the simulated target centroid, the rate of scintillation being preselected as one preferrably within the missile radar tracking dynamics and outside the missile flight control dynamic response. Such frequency range is very broad and relatively easy to estimate from existing classes of missiles. In this way, the missile sensor system will yet respond to the simulated target, while the missile flight control system serves as a smoothing filter, assuring that the missile will attempt a course between the two cooperating aircraft 10 and 11. Such synchronous switching control to effect scintillation may be accomplished by a simple two-way communication link (not shown).

An operational advantage of the single common amplifier arrangement of each of the two vehicle systems 10 and 11 of FIG. 2 is the fail-safe feature. Should either RF amplifier fail to provide transmission at an adequate level, then both modes of cooperation between the two aircraft are disabled. Thus, a pilot of one vehicle by intentionally disabling his single amplifier so as to avoid serving as target beacon, cannot force his companion to serve as a target beacon.

Figure 4:
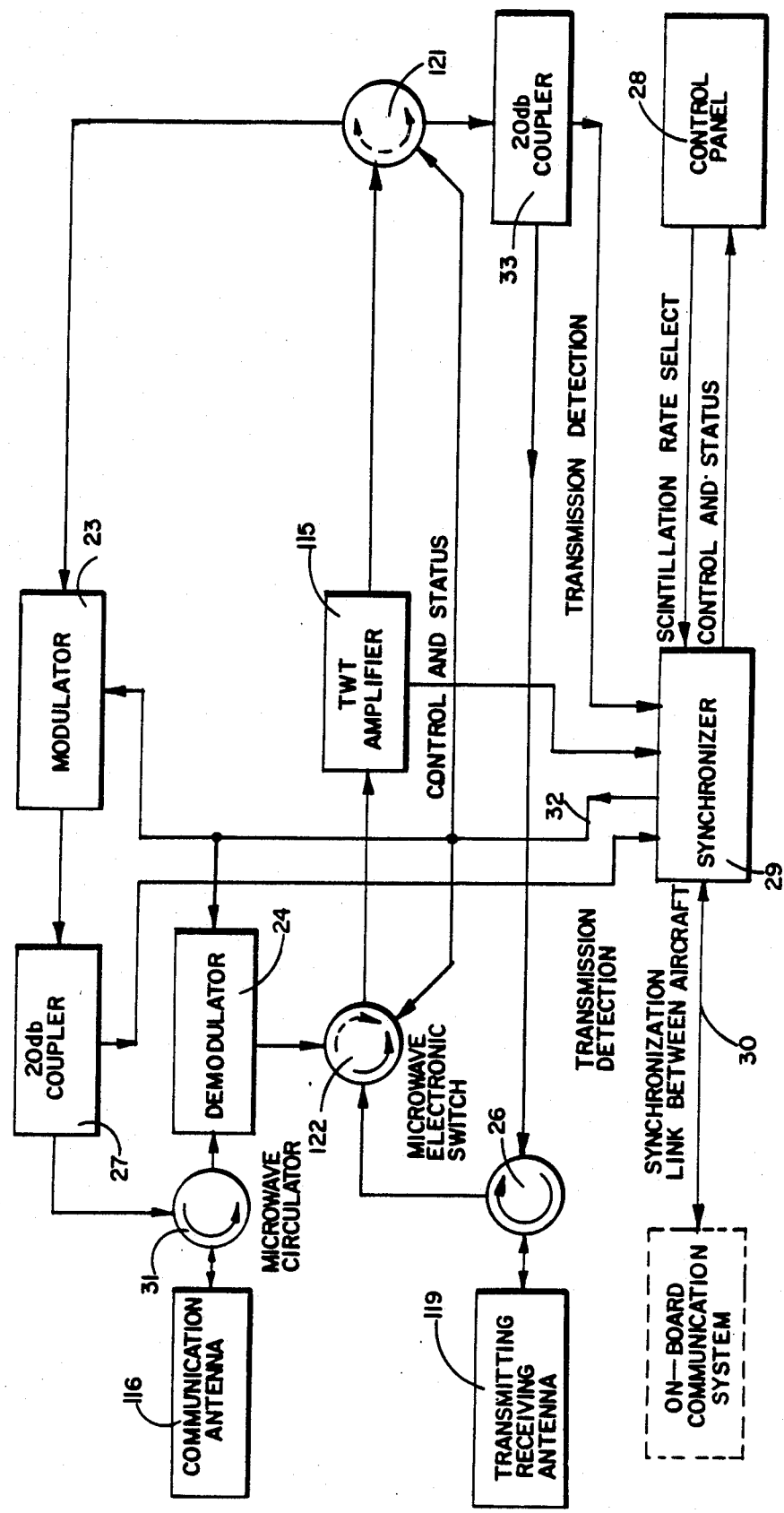
FIG. 4 is a block diagram in further detail of the arrangement of FIG. 2.

A block diagram illustrating in further detail one of the systems for either of aircraft 10 and 11 of FIG. 2 is shown in FIG. 4.

Referring now to FIG. 4, there is illustrated in further detail the embodiment of FIG. 2 and including the synchronization link. There are provided antennas 116 and 119 and RF amplifier 115, corresponding to like referenced elements of FIG. 2.

Figure 3:
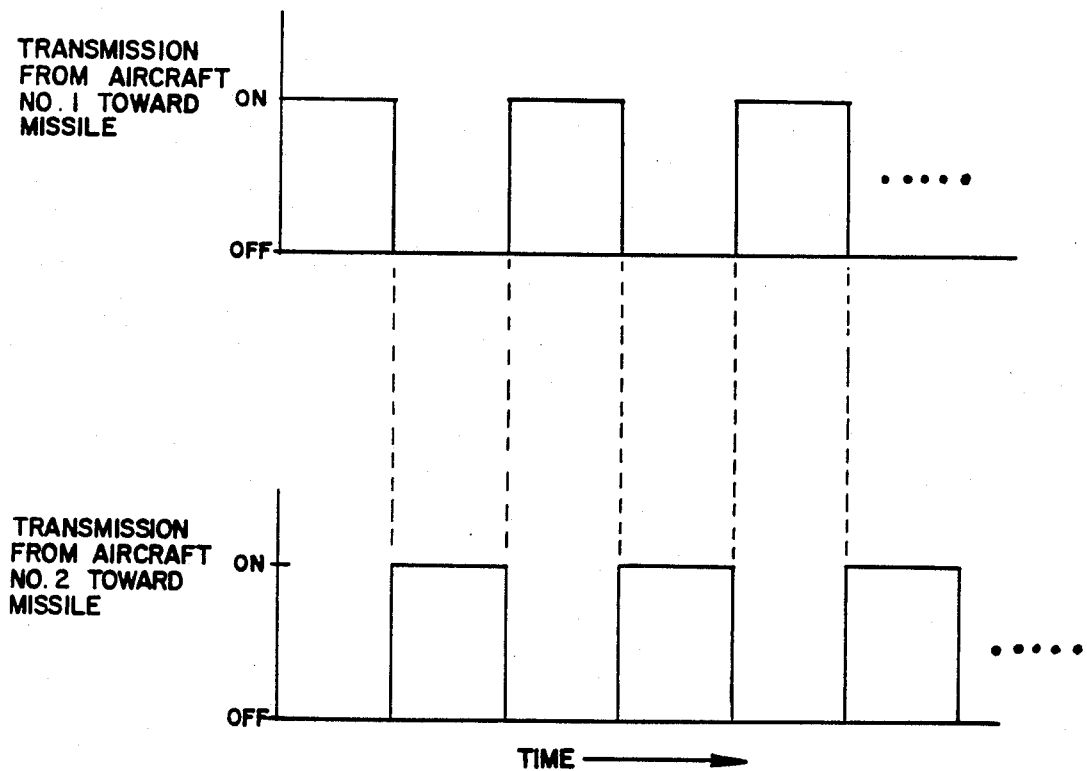
FIG. 3 is a timing diagram, illustrating the mode of cooperation of the arrangement of FIG. 2.

When the system is acting as a receiver of the missile illuminator signal, energy impinging on the transmitting/receiving antenna 119 is passed through a first circulator 26 which directs the signal to an electronic microwave switch 122 used to control the input to a travelling wave tube (TWT) amplifier chain 115. Microwave switch 122 serves to alternate the transmission mode as shown in FIG. 3, and to disable the amplifier 115 if a synchronization pulse is not received from the cooperating aircraft and indicating that it has transmitted the proper power level in the correct sequence. The signal is amplified by TWT amplifier chain 115. The signal is passed through a variable microwave attenuator included in the TWT amplifier chain 115. The variable microwave antenna within the TWT amplifier chain 115 is adjusted after system installation to set the overall gain at the required operating level.

The TWT amplifier chain includes CW type tubes that will handle either CW or pulsed transmission of the missile system.

Following the amplification at the missile frequency, the signal is switched by a switch 121 into the input of modulator 23, to be modulated onto a higher-frequency carrier. After modulation, a small portion of the signal is extracted by a 20 db coupler 27 for monitoring the amplifier operation at control 28. If a transmission of sufficient magnitude is detected, a synchronizer 29 generates a pulse to send to the other aircraft over the synchronization link 30. (A similar pulse from the other aircraft must be received by the synchronizer 29 prior to each transmission interval.) The modulated signal is then passed through another circulator 31 to the communicating antenna 116 for transfer to the cooperating aircraft.

Upon a change of state of a mode control signal on the output control line 32 of synchronizer 29, the system of FIG. 4 acts as a transmitter to the missile 12 (of FIG. 3). When acting as a transmitter to the missile, communication antenna 116 receives energy at the higher modulating frequency from the cooperating aircraft. After passing through circulator 31, the signal is demodulated by modulator 24 and switched by switch 122 to the TWT amplifier chain 115, wherein it is amplified as in the alternate receiver mode. The output of TWT amplifier chain 115 is then switched by switch 121 to circulator 26, which couples the signal transmitting/receiving antenna 119 for transmission toward the missile. Prior to passing through the circulator, a small signal sample of the transmission energy is extracted by a 20 db coupler 33 to monitor system performance.

Accordingly, there has been described electronic counter measure means for use by two cooperating aircraft against a radar-homing missile.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A communication method for use by two mutually cooperating aircraft as doppler countermeasure means against an active radar-homing anti-aircraft missile, comprising the steps of transferring doppler-shifted radar signals received from said missile at each to the other of said two mutually cooperating aircraft; and retransmitting said transferred radar signals toward said homing missile.

2. A communication link for use by two mutually cooperating aircraft as countermeasure means against an active radar-homing anti-aircraft missile, comprising first and second tranceiver means aboard a respective one of said two aircraft, said first transceiver means arranged to receive radio energy from within a solid angle sector generally forward of a first one said of said aircraft for transmission of said energy toward a second one of said aircraft and receiving radio energy from said second aircraft for transmission generally forward of a said first aircraft, said second transceiver means arranged to received radio energy from within a solid angle sector generally forward of said aircraft for transmission of said energy toward said first aircraft and receiving radio energy from said first aircraft for transmission generally forward of said second aircraft.

3. The device of claim 2 in which each said transceiver comprises a receiving antenna responsive to radar interrogation signals;

a communication transmitter responsively coupled to said receiving antenna;

a communication receiving antenna; and a relay transmitter responsively coupled to said communication receiving antenna.

4. The device of claim 2 in which each said transceiver comprises a transmit/receive antenna;

a communication antenna;

a first and second transmit-receive switch respectively coupled to a respective one of said antennas, said switches being operated synchronously in mutually exclusive switching states; and single common RF amplifier means for transporting RF signals from a receive terminal of each of said transmit-receive switches to a transmit terminal of the other of said two transmit switches.

* * * * *